US010843673B2

(12) United States Patent
Hanslik et al.

(10) Patent No.: US 10,843,673 B2
(45) Date of Patent: Nov. 24, 2020

(54) COMPRESSED AIR BRAKE SYSTEM FOR A VEHICLE AND A METHOD FOR CONTROLLING A COMPRESSED AIR BRAKE SYSTEM OF THIS TYPE

(71) Applicant: WABCO GmbH, Hannover (DE)

(72) Inventors: Daniel Hanslik, Isernhagen (DE); Stephan Kallenbach, Hannover (DE); Alexander Wendlandt, Hannover (DE)

(73) Assignee: WABCO GMBH, Hannover (DE)

(*) Notice: Subject to any disclaimer, the term of this patent is extended or adjusted under 35 U.S.C. 154(b) by 113 days.

(21) Appl. No.: 15/778,630

(22) PCT Filed: Nov. 7, 2016

(86) PCT No.: PCT/EP2016/001839
§ 371 (c)(1),
(2) Date: May 24, 2018

(87) PCT Pub. No.: WO2017/088952
PCT Pub. Date: Jun. 1, 2017

(65) Prior Publication Data
US 2018/0354483 A1    Dec. 13, 2018

(30) Foreign Application Priority Data
Nov. 28, 2015   (DE) .................. 10 2015 015 471

(51) Int. Cl.
*B60T 15/02* (2006.01)
*B60T 13/66* (2006.01)
(Continued)

(52) U.S. Cl.
CPC ............ *B60T 13/662* (2013.01); *B60T 7/042* (2013.01); *B60T 7/22* (2013.01); *B60T 8/171* (2013.01);
(Continued)

(58) Field of Classification Search
CPC ...... B60T 13/683; B60T 15/027; B60T 8/327; B60T 8/342; B60T 8/362; B60T 8/4818;
(Continued)

(56) References Cited

U.S. PATENT DOCUMENTS

| 4,861,115 A * | 8/1989 | Petersen ................. B60T 8/268 303/15 |
| 6,354,671 B1 * | 3/2002 | Feldmann ............... B60T 7/042 303/15 |
| 6,742,850 B1 * | 6/2004 | Eckert ..................... B60T 7/042 180/170 |
| 2004/0012252 A1 | 1/2004 | Meyer et al. |

(Continued)

FOREIGN PATENT DOCUMENTS

| CN | 102652084 A | 8/2012 | |
| CN | 201680066433 A | 7/2018 | |
| DE | 3337800 A1 * | 5/1984 | ............. B60T 8/367 |

(Continued)

*Primary Examiner* — Bradley T King
*Assistant Examiner* — Stephen M Bowes
(74) *Attorney, Agent, or Firm* — Leydig, Voit & Mayer, Ltd.

(57) ABSTRACT

A method for controlling a compressed air brake system of a vehicle includes outputting an analog driver brake pressure via a brake pressure control line during driver braking by operating a brake pedal, a switching device set in a driver braking position to a brake circuit with at least one ABS stop valve device, a brake line, and a wheel brake. The method additionally includes, in the presence of both driver braking and the external brake demand signal, measuring the driver brake pressure and determining a driver brake pressure value. Furthermore, the method includes forming a combined brake pressure value by adding or superimposing the driver brake pressure value and an external brake pressure value contained in the external brake demand signal, and switching the switching device into the functional position and controlling the combined brake pressure value from the system pressure by actuating the ABS stop valve device.

18 Claims, 2 Drawing Sheets

(51) Int. Cl.
*B60T 7/04* (2006.01)
*B60T 7/22* (2006.01)
*B60T 8/171* (2006.01)
*B60T 13/68* (2006.01)

(52) U.S. Cl.
CPC .......... *B60T 13/683* (2013.01); *B60T 15/024* (2013.01); *B60T 15/027* (2013.01); *B60T 2201/024* (2013.01)

(58) Field of Classification Search
CPC . B60T 7/12; B60T 7/22; B60T 8/1708; B60T 2201/02; B60T 2201/022; B60T 2201/024
See application file for complete search history.

(56) References Cited

U.S. PATENT DOCUMENTS

| | | | |
|---|---|---|---|
| 2012/0217794 A1* | 8/2012 | Wieder | B60T 15/027 303/113.2 |
| 2012/0299368 A1* | 11/2012 | Woerner | B60T 8/327 303/15 |
| 2018/0354483 A1 | 12/2018 | Hanslik | |

FOREIGN PATENT DOCUMENTS

| | | | |
|---|---|---|---|
| DE | 3400566 A1 * | 7/1985 | ............. B60T 8/349 |
| DE | 3617356 A1 | 11/1987 | |
| DE | 19937818 A1 | 2/2001 | |
| DE | 10232792 A1 | 2/2004 | |
| DE | 102013226004 A1 | 6/2014 | |
| EP | 0547407 A1 | 6/1993 | |
| KR | 20140005562 A | 1/2014 | |

\* cited by examiner

COMPRESSED AIR BRAKE SYSTEM FOR A VEHICLE AND A METHOD FOR CONTROLLING A COMPRESSED AIR BRAKE SYSTEM OF THIS TYPE

CROSS REFERENCE TO RELATED APPLICATIONS

This application is a U.S. National Stage Application under 35 U.S.C. § 371 of International Application No. PCT/EP2016/001839 filed on Nov. 7, 2016, and claims benefit to German Patent Application No. DE 10 2015 015 471.0 filed on Nov. 28, 2015. The International Application was published in German on Jun. 1, 2017 as WO 2017/088952 A1 under PCT Article 21(2).

FIELD

The invention concerns a compressed air brake system for a vehicle and a method for controlling a compressed air brake system of this type.

BACKGROUND

Compressed air brake systems for vehicles can be subdivided into compressed air brake systems with an analog brake pressure line, also known as ABS systems, and electronic brake systems, also known as EBS systems, according to the modulation of the brake pressure that is applied in a driver braking mode by the driver operating the brake pedal.

In the case of analog brake systems or ABS brake systems, when operating the brake pedal an analog compressed air value is output to a brake pressure control line from a connected brake valve and is subsequently passed through to one or more brake circuits—possibly via further valve devices such as an axle load distribution device and valve devices for connecting further functions. Furthermore, an ABS control device for the modulation of ABS stop valves is provided. The analog driver brake pressure is in general volumetrically boosted by relay valves during this. The driver brake pressure entered by the driver or a brake pressure present in the brake circuit may be sensed.

In the case of electronic brake systems or EBS systems, the operation of the brake pedal by the driver is sensed, for example by means of a displacement sensor, and a brake pressure setpoint value is determined therefrom, which is subsequently modulated as an analog brake pressure value by a system pressure, in general a reservoir pressure of a reservoir container, by for example a clocked proportional valve, and is delivered to a brake circuit with at least one wheel brake.

In the case of EBS systems, changes relative to the brake pressure setpoint value specified by the driver are carried out during the modulation of the analog brake pressure value, for example even external brake value specifications by driver assistance functions.

Driver assistance functions that request a driver assistance braking operation are in general not provided for the direct ride stability of the vehicle, but enable adaptation of the driving behavior of the vehicle to the road traffic for example. Driver assistance functions of this type or ADAS (additional driver assistant systems) comprise in particular ACC (automotive cruise control, a distance control method) for maintaining a distance from a vehicle ahead; furthermore, emergency brake systems are also provided, in particular to avoid an expected resulting frontal crash and/or to reduce the severity of an expected accident on detecting a critical traffic situation, and are also referred to as AEBS (advanced emergency braking systems). Further driver assistance functions are braking assistance functions for boosting a driver braking demand on detecting a critical traffic situation, a so-called EBA (electronic brake assistant) for suitably boosting the driver braking demand on detecting a possible frontal crash for example.

The driver assistance functions are provided in separate driver assistance control units or control devices and can be augmented depending on the desired equipment of the respective vehicle. The driver assistance control devices determine a braking demand and transmit the same as an external braking demand signal, also known as an XBR signal (External Brake Request), to the control device of the brake system in order to take said braking demand into account.

In the case of an EBS system, the EBS control device can process the external braking demand request alternatively to or in addition to a driver braking demand determined by brake pedal operation.

In the case of analog brake systems or ABS brake systems, in general a valve or a valve device is provided as a switching device, which for example in a base position, i.e. in a driver braking mode, passes the analog driver brake pressure through to a brake circuit, or on activation initiates a driver assistance braking operation and passes a system pressure through; the system pressure or reservoir pressure can then subsequently be modulated to the analog brake pressure value in the brake circuit by clocking the ABS stop valve-device. The switching device can in particular be implemented as a solenoid 3/2-way valve that is changed over by the ABS control device with a switching signal.

With an ABS brake system of such a type, which must take into account an additional driver assistance function, in general only an alternative modulation either of the analog driver brake pressures or the external braking demand signal is thus possible. In this connection, maximum methods are known, with which the analog driver brake pressure and the externally demanded brake pressure are compared and accordingly the larger value is modulated by the switching device remaining in the base position or driver braking position in order to modulate the larger driver brake pressure, or the function position is adjusted to modulate the larger externally demanded brake pressure.

SUMMARY

In an embodiment, the present invention provides a method for controlling a compressed air brake system of a vehicle. The method includes outputting an analog driver brake pressure via a brake pressure control line during driver braking by operating a brake pedal, a switching device set in a driver braking position to a brake circuit with at least one ABS stop valve device, a brake line, and a wheel brake. The method further includes, if there is an external brake demand signal of a driver assistance system without simultaneous driver braking, changing over the switching device to a functional position, passing a system pressure through to the ABS stop valve device, and controlling an analog brake pressure on the at least one brake line of the brake circuit with the at least one wheel brake by actuating the ABS stop valve device. The method additionally includes, in the presence of both driver braking and the external brake demand signal, measuring the driver brake pressure and determining a driver brake pressure value. Furthermore, the method includes forming a combined brake pressure value by adding or superimposing the driver brake pressure value and an external brake pressure value contained in the external brake demand signal, and switching the switching device into the functional position and controlling the combined brake pressure value from the system pressure by actuating the ABS stop valve device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
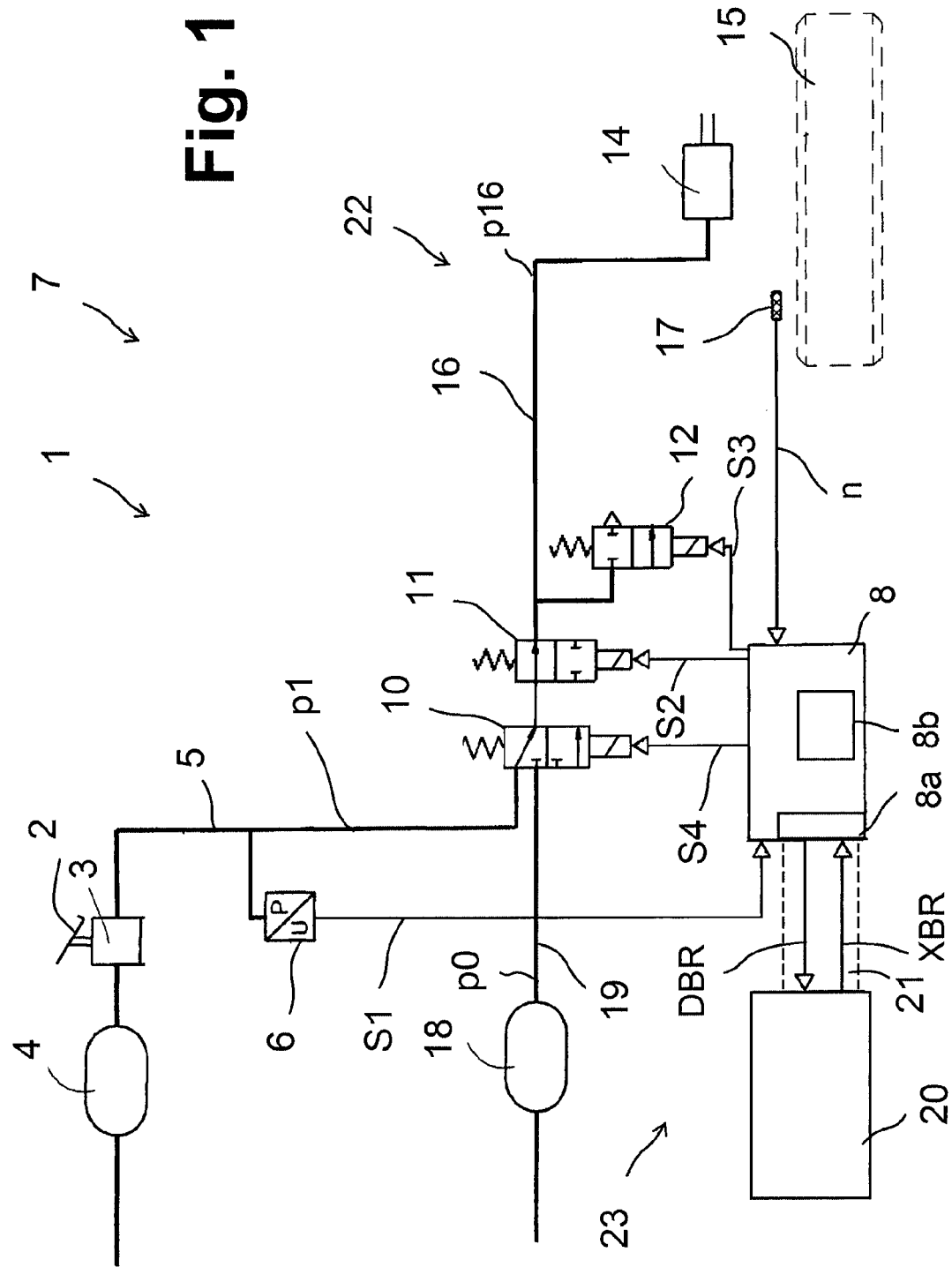
FIG. 1 shows an electropneumatic wiring diagram of a brake system according to different embodiments of the invention.

State-of-the-art methods can result in a disadvantageous switching back and forth of the switching device, wherein a sudden change in the braking behavior can occur with a changeover process of this type, because for example when changing over from the driver braking mode, in which the analog driver brake pressure is applied to the switching device, to the driver assistance braking operation, the higher system pressure is initially very suddenly applied to the switching device and can only be reduced subsequently by the ABS stop valves in a clocked manner.

Embodiments of the invention provide a compressed air brake system and a method for controlling a pressure brake system of this type that enables a high level of braking comfort at relatively low cost while taking account of an external braking demand signal of a driver assistance function.

According to one or more embodiments of the invention, an analog driver brake pressure applied by the driver by means of the brake pedal and the brake valve is sensed and subsequently taken into account as a driver brake pressure value, so that a combined brake pressure value can be determined from the driver brake pressure value and the external brake pressure value of the external braking demand signal, and can subsequently be adjusted by the ABS control device by controlling the ABS stop valve device with the system pressure.

Thus in the combined braking mode, in particular the switching device can be changed over to the functional position, i.e. the switch position for the driver assistance braking mode.

According to embodiments of the invention, the driver braking demand and the external braking demand can be taken into account additively or cumulatively or by superimposition, preferably by carrying out modulation corresponding to the driver assistance braking mode, i.e. from a system pressure, in particular by clock controlling the ABS stop valve device. For a combined braking mode, the switching device is thus advantageously switched into the (actuated) functional position thereof of the driver assistance braking mode.

The sensing of the driver brake pressure can be carried out by means of a pressure sensor connected to the brake pressure control line. For this purpose, the two brake pressure values can for example be simply added. Furthermore however, more complex determinations are also possible.

According to a preferred embodiment, addition of the driver brake pressure value and the external brake pressure value can be carried out as long as the driver brake pressure value does not exceed a proportion threshold value. On exceeding or reaching the proportion threshold value, by contrast, a changeover to a driver braking mode can be carried out, i.e. in particular the switching device can be changed over to the (base) position thereof for the driver braking mode. This is based on the idea that for a larger proportion of the driver braking demand, i.e. a relevant driver brake operation, the driver should receive a direct reaction to his brake pedal operation, for which the driver braking mode is more suitable.

Furthermore, a lower proportion threshold value and an upper proportion threshold value can also be provided, which define a transition region in which for example a ramp is used, with which for example the proportion of the driver brake pressure value is increased, for example linearly; on reaching the upper proportion threshold value, a full changeover to the driver braking mode can be carried out, i.e. the switching devices can be changed over to the (base) positions thereof. Owing to the transition region with the two proportion threshold values, in particular excessively rapid switching back and forth can also be avoided. In this connection, the driver assistance brake pressure can still be taken into account in the transition region to a small extent.

The determination of the combined brake pressure value can be carried out on the one hand in the ABS control device by the ABS control device determining the combined pressure value from the sensed driver brake pressure value and the transmitted external brake pressure value, and subsequently controlling the combined brake pressure value by actuating the switching device and the ABS control valve device.

Modulation of this type by the ABS control device has the advantage here that higher brake pressure values can be adjusted than for example are specified by the external braking demand signal. As the driver assistance functions are additionally used by separate control units, depending on the design of the vehicle with different driver assistance functions, they are in general also offered as standard for different types of vehicle and different brake systems. Thus, an external braking demand signal output by a driver assistance control device will in general demand external brake pressure values that also take into account weaker brake systems and are therefore not too high. Thus, for example, an ABS compressed air brake system can modulate brake pressures up to 10 bar; however, some external driver assistance control devices only demand brake pressures up to 8 bar in the XBR signal thereof for example, so that said brake pressures can also be implemented by weaker or older brake systems. During the determination of the combined brake pressure value in the ABS control device, the ABS control device can use the brake pressure values that can actually be controlled and can thus superimpose or add an additional brake pressure value onto the external braking demand signal.

Alternatively, the combined brake pressure value can also be determined in the external driver assistance control device and subsequently transmitted by means of the external braking demand signal. In a case of this type, the ABS control device thus first determines the driver brake pressure value by sensing the analog driver brake pressures and sends the driver brake pressure value by means of a data signal, for example again via the internal vehicle data bus, to the external driver assistance control device, so that the external driver assistance control device determines the XBR signal with the combined brake pressure value and sends it to the ABS control device. The ABS control device can thus control the combined braking mode as a normal driver assistance braking mode according to the transmitted XBR signal. The additional functionality can be embodied in the ABS control device in such a case by designing or programming the ABS control device to send a driver brake pressure value determined by sensing to an external driver assistance control device without the ABS control device being designed to embody three different braking modes.

A compressed air brake system 1 of a utility vehicle is shown in FIG. 1 for a brake circuit. The driver actuates a brake valve 3 by means of a brake pedal 2, wherein the valve applies the compressed air from a first compressed air reservoir 4 to a brake pressure control line 5. Thus, depending on the operation of the brake pedal 2 an analog driver brake pressure p1 is applied to the brake pressure control line 5 by the brake valve 3. A pressure sensor 6 measures the analog driver brake pressure p1 and outputs a brake pressure measurement signal S1 to an ABS control device 8. The analog driver brake pressure p1 is subsequently delivered to a switching valve device 10, which is embodied here as a 3/2-way solenoid valve or switching valve 10. In the base position thereof, the switching valve 10 is in the driver braking position thereof, in which it supplies the brake pressure control line 5 of at least one brake circuit, i.e. via ABS stop valves 11, 12, i.e. an ABS inlet valve 11 and an ABS outlet valve 12, and a brake line 16 of a wheel brake 14 that is provided on a vehicle wheel 15.

In said schematic drawing, further known valves, for example for axle load distribution, and a relay valve provided upstream of the ABS stop valves 11,12, are not shown for the sake of simplicity. Furthermore, the different brake circuits and actuations of a plurality of wheel brakes of a brake circuit are not shown.

The switching valve 10, when in the base position thereof that is shown, then passes the driver brake pressure p1 to the brake line 16 to the wheel brake 14 via the open ABS inlet valve 11 with the ABS outlet valve 12 closed.

In said analog driver braking mode, the ABS stop valves 11 and 12 are thus only used for the ABS control mode in the known phases increasing pressure-maintaining pressure-reducing pressure, for which the ABS stop valves 11 and 12 are controlled by the ABS control device 8 by means of ABS control signals S2 and S3. For this purpose furthermore, the ABS control device 8 receives wheel revolution rate signals n of the wheel revolution rate sensors (ABS sensors) 17. Thus, in the analog brake control mode the analog driver brake pressure p1 entered by the driver by means of the brake pedal 2 and the brake valve 3 is delivered via the brake pressure control line 5 and the brake line 16 to the wheel brake 14, in general with an additional relay valve for boosting the quantity for example.

Furthermore, the compressed air brake system 1 enables comfort brake functions or driver assistance functions, which are also referred to as ADAS (Additional Driver Assistant System) and do not concern the ride stability control itself, but can be provided in addition. Examples of an ADAS are in particular ACC (automotive cruise control, a separation maintenance system), AEBS (emergency brake system) for automatically initiating emergency braking on detecting a hazard situation to prevent an accident, and/or on detecting a predicted accident to reduce the severity of the accident (pre-crash system). Another ADAS is EBA (electronic brake assistant), which engages before a hazard situation by selective braking and thereby uses further criteria as an emergency brake system; an EBA can in particular increase the braking force in the case of weak brake operation by the driver.

A driver assistance control device 20 outputs an external brake demand signal XBR to an interface 8a of the ABS control device 8 for this purpose. The data communications can in particular be carried out by means of vehicle-internal data, for example a CRN bus 21.

The changeover from the analog driver braking mode to the driver assistance braking mode X-BB is carried out by means of the switching valve 10, which is actuated by the ABS control device 8 by means of a switching signal S4.

If there is no braking demand by the driver, i.e. the ABS control device 8 is not measuring operation of the brake pedal 2 by means of the brake pressure measurement signal S1, a driver assistance braking mode X-BB is controlled, in which the ABS control device 8 changes the switching valve 10 into the functional position thereof by means of the switching signal S4. In the functional position, a system pressure (reservoir pressure) p0 of the second compressed air reservoir 18 is passed via the supply line 19 and the switching valve 10 to the ABS stop valves 11, 12, and by clocking the ABS stop valves 11, 12, i.e. the ABS inlet valve 11 and the ABS outlet valve 12, is controlled on the brake line 16 by means of the ABS control signals S2, S3. As a result, the external brake pressure value pxw specified in the external brake demand signal XBR can be regulated as an analog service brake pressure value p16 in the brake line 16. In this connection, a further pressure sensor can additionally be provided on the brake line 16; but this is not necessary.

Besides the driver braking mode and the pure driver assistance braking mode X-BB, furthermore a combined braking mode K-BB is provided, which is initiated by the ABS control device 8 if there are both a driver braking demand—determined by the brake pressure measurement signal S1—and an external brake demand signal XBR. In the combined braking mode K-BB, the external braking demand, i.e. the external brake pressure value pxw, is used and furthermore a driver brake pressure value p1w is determined from the measurement signal S1, i.e. the sensed driver brake pressure p1.

If the driver operates the brake pedal 2 partially, thus for example a driver brake pressure p1 can be controlled with a driver brake pressure value p1w of 3 bar by the brake valve 3, which is determined by the ABS control device 8 by means of the brake pressure-measurement signal S1 as a 30 percent operation; accordingly a driver brake pressure p1 equal to 7 bar is determined as a 70 percent operation.

Then a combined brake pressure value pcw is determined by taking into account the external brake pressure value pxw and the driver brake pressure value p1w together or superimposing the external brake pressure value pxw and the driver brake pressure value p1w; this can be carried out by additive superimposition, but also by non-additive or non-linear superimposition.

In this connection, further conditions can be used. Thus, the determined combined brake pressure value pcw can be limited to a maximum value pc_max.

Alternatively or additionally, it can be provided that in the case in which the driver brake pressure value p1w exceeds an upper limit value p1-max of for example 7 bar or 8 bar, the driver brake pressure p1w is controlled as a combined brake pressure value pcw, and/or in the case in which the external brake pressure value pxw exceeds an upper limit value px_max of for example 7 bar or 8 bar, the external brake pressure value pxw is controlled as a combined brake pressure value pcw. A determination of this type can thus constitute the formation of a maximum value, wherein a maximum or the larger of the two brake pressures p1 and px is controlled if it additionally exceeds the upper limit value p1-max or px_max.

In the case in which the driver brake pressure value p1w exceeds the external brake pressure value pxw, a further modification of the combined braking mode K-BB can involve changing over from the combined braking mode K-BB or addition mode to the driver braking mode and thereby stopping the switching signal S4. As a result, a better braking feel or a direct association of the determined braking power to his brake pedal operation can be directly imparted to the driver, wherein the external braking demand signal XBR is also over-fulfilled in this case.

The determination of the combined brake pressure pc can be carried out in the ABS control device 8 as described above. Alternatively however, said determination can also be carried out in the external driver assistance control device 20. For this purpose, the ABS control device 8 transmits the driver brake pressure value p1w determined by the brake pressure measurement signal S1 as a transmission signal DBR, so that the external driver assistance control device 20 in turn determines the external braking demand signal XBR, for example by addition, possibly with the above further conditions, and outputs it back to the ABS control device 8, so that based on the external brake demand signal XBR, the ABS control device 8 outputs the switching signal S4 in the functional position of the switching valve 10 and controls the ABS stop valves 11 and 12 by means of the ABS control signals S2 and S3.

Furthermore, a lower proportion threshold value and an upper proportion threshold value can also be provided, which define a transition region, in which for example a ramp is used, with which the proportion of the driver brake pressure value p1w for example is increased, for example linearly; on reaching the upper proportion threshold value, a full changeover to the driver braking mode can thus be carried out, i.e. the switching devices are changed over to the (base) position thereof. By means of the transition region with the two proportion threshold values, in particular excessively rapid switching back and forth can be prevented. In this connection, the driver assistance brake pressure in the transition region can still be taken into account to a small extent.

Alternatively to or in addition to said modification, a transition region can also be used, for example as a ramp. The ramp can be defined by the proportion ap1 of the driver brake pressure value p1w and the proportion apx of the external brake pressure value pxw in the combined brake pressure value pcw, with ap1+apx=1. Thus, in the case in which the proportion ap1 of the determined driver brake pressure value p1w reaches a lower proportion threshold values Br_sw1, for example 0.5 (50%), subsequently the proportion of the external brake pressure value pxw in the combined brake pressure value pcw is linearly reduced until the determined driver brake pressure value p1w reaches an upper proportion threshold value Br_sw2, at which the external brake pressure value pxw and thus also the external braking demand signal XBR are no longer taken into account. On reaching the upper proportion threshold value Br_sw2, the switching valve 10 can thus be switched back, i.e. S4=0, to initiate the normal driver braking mode.

With the embodiments described above, downslope information can also be taken into account, i.e. information about the gradient (positive gradient or negative gradient (downslope)) of the highway. Thus, in particular the proportion threshold value Br_sw 1 and the proportion threshold value Br-sw2 can be formed depending on the downslope information.

Figure 2:
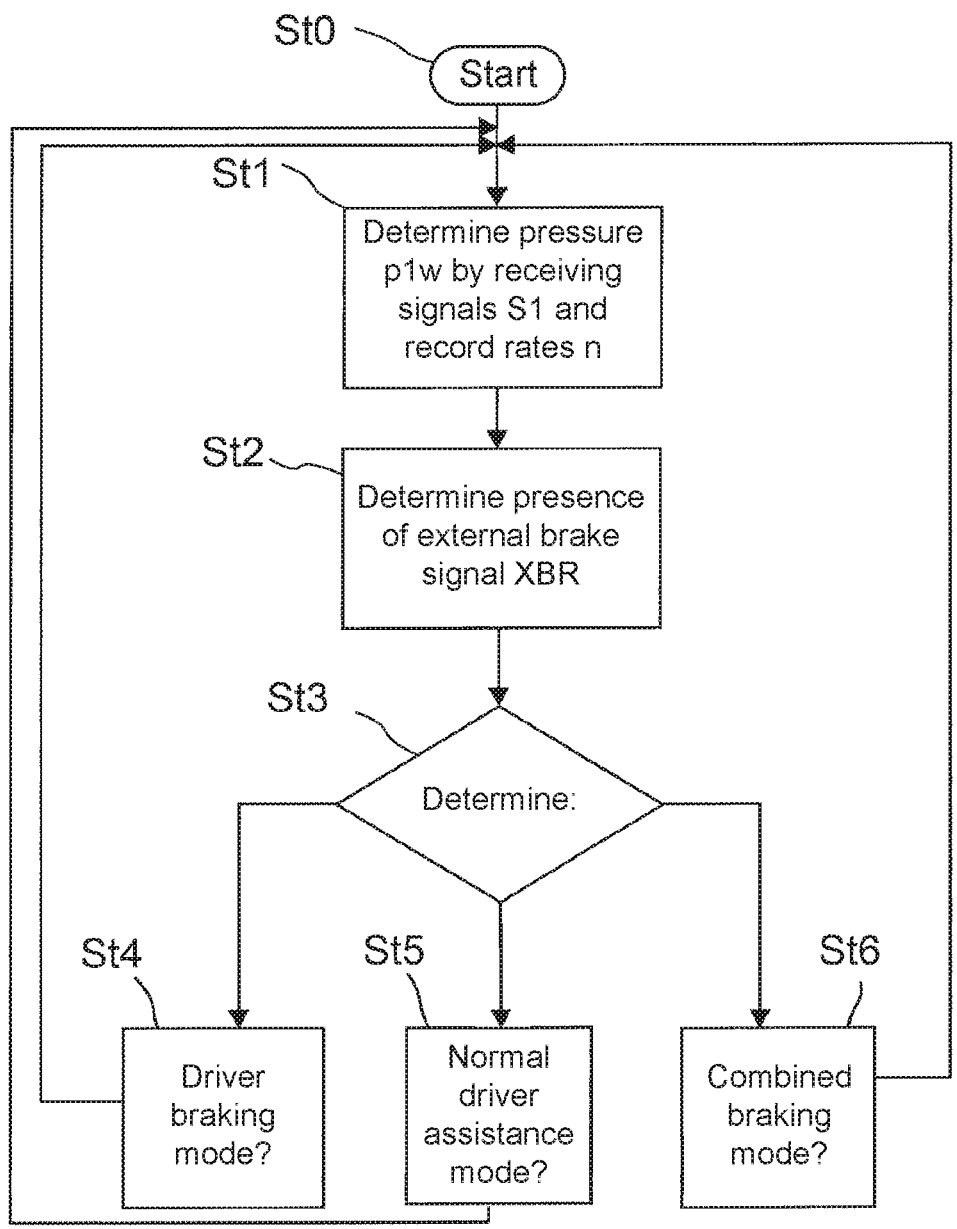
FIG. 2 shows a flow chart of a method according to an embodiment of the invention.

A method according to an embodiment of the invention is thus implemented according to FIG. 2 to the effect that following a start in the step St0, in particular in driving mode and thus switching on the ABS control device 8, subsequently in step St1 during the normal driving mode driving state signals and driving stability signals are continually recorded and processed. Thus, in particular the driver brake pressure value p1w is determined by receiving the brake pressure-measurement signals S1, and furthermore wheel revolution rates n of the vehicle wheel 15 and accordingly of the further vehicle wheels may be recorded. The switching valve 10 is disposed in the base position thereof, so that on operating the brake pedal 2 a driver braking mode is carried out without the engagement of the ABS control device 8 being necessary for this first. During this, an ABS control mode can occur, so that the ABS control device 8 then actuates the ABS stop valves 11, 12 by means of the ABS control signals S2, S3.

In the step St2 a query is carried out as to whether there is an external brake signal XBR.

In the step St3 it is decided whether:
- according to step St4 a driver braking mode exists, i.e. S4=0; this can in particular be carried out if there is no external brake signal XBR, or also according to the above embodiments, if for example the external brake signal XBR is not taken into account because the external brake pressure value pxw is too low,
- according to step St5, a normal driver assistance braking mode X-BB exists, i.e. in the presence of an external brake demand signal (XBR) and measurement, such that there is no driver braking (FB), i.e. p1w=0 or (in general at atmospheric pressure), with S4=1, i.e. changing over the switching valves 10 to the functional position and clocking the ABS stop valves 11, 12,
- according to step St6, a combined brake pressure value pcw is determined as the sum of the driver brake pressure value p1w and the external brake pressure value pxw, i.e. pcw=p1w+pxw, with S4=1, i.e. changing over the switching valves 10 to the functional position and clocking the ABS stop valves 11, 12.

In this connection, with the embodiments described above a more complex determination and case distinction may possibly be carried out to form a limit on the combined brake pressure value pcw. The method is then returned to before the step St1 in each case and is thus carried out continuously.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1 compressed air brake system
2 brake pedal
3 brake valve
4 first compressed air reservoir
5 brake pressure control line
6 pressure sensor
7 vehicle, in particular utility vehicle
8 ABS control device
8a interface of the ABS control device 8
10 switching device, switching valve
11, 12 ABS stop valves
11 ABS inlet valve
12 ABS outlet valve
14 wheel brake
15 vehicle wheel
16 brake line
17 wheel revolution rate sensor (ABS sensor)
18 second compressed air reservoir
19 supply line
20 external driver assistance control device
21 CAN bus
22 brake circuit
23 driver assistance system
n wheel revolution rate
S1 brake pressure measurement signal
S2, S3 ABS control signals
S4 switching signal
XBR external brake demand signal
DBR transmission signal from the ABS control device 8 to the external driver assistance control device 20
p0 system pressure
p1 driver brake pressure
px external brake pressure
pc combined brake pressure
p16 analog service brake pressure in the brake line 16
p1w driver brake pressure value
pxw external brake pressure value
pcw combined brake pressure value
pc_max limit value for the combined brake pressure value
Br_sw1 lower proportion threshold value
Br_sw2 upper proportion threshold value
St0-St4: steps of the method
FB driver braking
FSt ride stability
HC frontal impact accident
BAS braking assistance function
VoV volume boosting
VV quantity boosting
Rp transition function, ramp
X-BB driver assistance braking mode
K-BB combined braking mode

The invention claimed is:

1. A method for controlling a compressed air brake system of a vehicle, the method comprising:
   outputting, in a presence of a driver braking demand and an absence of an external brake demand signal, an analog driver brake pressure to a brake circuit by connecting a brake pressure control line to a brake line, wherein a switching device is set in a first position so as to connect the brake pressure control line to the brake line, and wherein the brake circuit includes at least one ABS stop valve device, the brake line, and a wheel brake;
   outputting, in an absence of a driver braking demand and a presence of an external brake demand signal, a system pressure to the ABS stop valve device by changing over the switching device to a second position, and controlling an analog external demand brake pressure in the brake line of the brake circuit by actuating the at least one ABS stop valve device; and
   outputting, in a simultaneous presence of the driver braking demand and the external brake demand signal, a combined brake pressure having a combined brake pressure value, wherein the combined brake pressure value is determined by:
      measuring the driver brake pressure and determining a driver brake pressure value,
      determining a ratio of the driver brake pressure value to a sum of the driver brake pressure value and an external brake pressure value contained in the external brake demand signal, and
      forming the combined brake pressure value by:
         adding the driver brake pressure value and the external brake pressure value when the ratio does not exceed a ratio threshold value, or
         providing, when the ratio exceeds the ratio threshold value, the driver brake pressure value as the combined brake pressure value,
   wherein the ratio threshold value is a value at which the driver brake pressure value exceeds the external brake pressure value, and
   wherein outputting the combined brake pressure is performed by controlling the switching device and actuating the ABS stop valve device so as to output the combined brake pressure.

2. The method as claimed in claim 1, wherein the external brake demand signal is output by a driver assistance control device, and
   wherein the driver assistance control device is a component of a driver assistance system that includes an adaptive cruise control system and/or an emergency brake system for avoiding and/or reducing a severity of a frontal collision.

3. The method as claimed in claim 1, wherein the ABS stop valve device is controlled for modulation of the external brake pressure value and/or for modulation of the combined brake pressure value.

4. The method as claimed in claim 3, wherein the ABS stop valve device includes an ABS inlet valve and an ABS outlet valve.

5. The method as claimed in claim 1, wherein the combined brake pressure value is limited to a maximum value.

6. The method as claimed in claim 1, wherein in the simultaneous presence of the driver braking demand and the external brake demand signal, the driver brake pressure value exceeding the external brake pressure value, outputting the combined brake pressure having the combined brake pressure value further comprises changing the switching device over to the first position.

7. The method as claimed in claim 1, wherein the combined brake pressure value is determined by an ABS control device of the compressed air brake system.

8. The method as claimed in claim 7, wherein the external brake demand signal is output by a driver assistance control device,
wherein, for the determination of the combined brake pressure value, the ABS control device transmits a signal indicating the driver brake pressure value to the driver assistance control device,
wherein the driver assistance control device determines the combined brake pressure value and transmits it back to the ABS control device as a new external braking demand signal for modulation of the combined brake pressure value with the switching device in the second position.

9. A compressed air brake system for a vehicle, comprising:
a brake pedal and a brake valve configured to be actuated by the brake pedal so as to output an analog driver brake pressure;
a brake pressure control line configured to pass the analog driver brake pressure;
at least one brake circuit with at least one ABS stop valve device, a brake line, and a wheel brake;
a switching device, configured to be set to a first position so as to connect the brake pressure control line to the at least one ABS stop valve device of the at least one brake circuit and to be set to a second position so as to connect a system pressure to the at least one ABS stop valve device of the at least one brake circuit;
an ABS control device configured to actuate the ABS stop valve device by ABS control signals and to actuate the switching device by a switching signal; and
a pressure sensor configured to measure the driver brake pressure and to output a brake pressure measurement signal with a driver brake pressure value to the ABS control device,
wherein the ABS control device comprises an interface for receiving an external braking demand signal of an external driver assistance control device,
wherein the ABS control device is configured to set, in a presence of a driver braking demand and an absence of the external braking demand signal, the switching device to the first position,
wherein the ABS control device is configured to set, in an absence of a driver braking demand and a presence of the external braking demand signal, the switching device to the second position,
wherein in the first position of the switching device, the brake pressure control line is connected to the at least one brake circuit for modulation of the analog driver brake pressure at the wheel brake for a driver braking mode,
wherein in the second position of the switching device, the system pressure is connected to the at least one brake circuit for setting an external brake pressure at the wheel brake by modulation of the ABS stop valve device by the ABS control device for a driver assistance braking mode,
wherein the ABS control device is configured to set, in a simultaneous presence of the external braking demand signal and the driver braking demand, a combined brake pressure having a combined brake pressure value,
wherein the combined brake pressure value is determined by:
determining a ratio of the driver brake pressure value to a sum of the driver brake pressure value and an external brake pressure value contained in the external braking demand signal, and
forming the combined brake pressure value by:
adding the driver brake pressure value and the external brake pressure value when the ratio does not exceed a ratio threshold value, or
providing, when the ratio exceeds the ratio threshold value, the driver brake pressure value as the combined brake pressure value,
wherein the ratio threshold value is a value at which the driver brake pressure value exceeds the external brake pressure value, and
wherein the ABS control device is configured to initiate a combined braking mode by setting the switching device to the functional position and modulating the ABS stop valve device to set the combined brake pressure value at the at least one wheel brake.

10. The compressed air brake system as claimed in claim 9, wherein the switching device is a solenoid valve with two positions, a non-actuated base position of which is the first position.

11. The compressed air brake system as claimed in claim 9, wherein the ABS stop valve device comprises an ABS inlet valve and an ABS outlet valve.

12. The compressed air brake system as claimed in claim 9, wherein the interface for receiving the external braking demand signal of the external driver assistance control device is connected to a vehicle-internal data bus for receiving the external braking demand signal.

13. The compressed air brake system as claimed in claim 9, wherein the ABS control device comprises a computer configured to determine the combined brake pressure value.

14. A method for controlling a compressed air brake system of a vehicle, the method comprising:
outputting, in a presence of a driver braking demand and an absence of an external brake demand signal, an analog driver brake pressure to a brake circuit by connecting a brake pressure control line to a brake line, wherein a switching device is set in a first position so as to connect the brake pressure control line to the brake line, and wherein the brake circuit includes at least one ABS stop valve device, the brake line, and a wheel brake;
outputting, in an absence of a driver braking demand and a presence of an external brake demand signal, a system pressure to the ABS stop valve device by changing over the switching device to a second position, and controlling an analog external demand brake pressure in the brake line of the brake circuit by actuating the at least one ABS stop valve device; and
outputting, in a simultaneous presence of the driver braking demand and the external brake demand signal, a combined brake pressure having a combined brake pressure value, wherein the combined brake pressure value is determined by:
measuring the driver brake pressure and determining a driver brake pressure value, and determining a ratio of the driver brake pressure value to a sum of the driver brake pressure value and an external brake pressure value contained in the external brake demand signal, and forming the combined brake pressure value by:
- adding, when the ratio does not exceed a lower ratio threshold value, the driver brake pressure value and the external brake pressure value,
- adding, when the ratio exceeds the lower ratio threshold value but does not exceed an upper ratio threshold value, the driver brake pressure value and a product of the external brake pressure value and a transition function, or
- providing, when the ratio exceeds the upper ratio threshold value, the driver brake pressure value as the combined brake pressure value, wherein the upper ratio threshold value is a value at which the driver brake pressure value exceeds the external brake pressure value, and wherein outputting the combined brake pressure is performed by controlling the switching device and actuating the ABS stop valve device so as to output the combined brake pressure.

15. The method of claim 14, wherein the transition function is a function that linearly reduces, between the lower ratio threshold value and the upper ratio threshold value, the contribution of the external brake pressure value to the sum of the driver brake pressure value and the external brake pressure value.

16. The method as claimed in claim 14, wherein the external brake demand signal is output by a driver assistance control device, and
wherein the driver assistance control device is a component of a driver assistance system that includes one or more of: an adaptive cruise control system, an emergency brake system for avoiding a frontal collision and/or for reducing severity of a frontal collision.

17. The method as claimed in claim 14, wherein the ABS stop valve device is controlled for modulation of the external brake pressure value and/or for modulation of the combined brake pressure value.

18. The method as claimed in claim 14, wherein the combined brake pressure value is limited to a maximum value.

* * * * *